US009069891B2

(12) United States Patent
Salapura et al.

(10) Patent No.: US 9,069,891 B2
(45) Date of Patent: *Jun. 30, 2015

(54) HARDWARE ENABLED PERFORMANCE COUNTERS WITH SUPPORT FOR OPERATING SYSTEM CONTEXT SWITCHING

(75) Inventors: Valentina Salapura, Yorktown Heights, NY (US); Robert W. Wisniewski, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 910 days.

This patent is subject to a terminal disclaimer.

(21) Appl. No.: 12/684,190

(22) Filed: Jan. 8, 2010

(65) Prior Publication Data

US 2011/0173503 A1    Jul. 14, 2011

(51) Int. Cl.
| | |
|---|---|
| G06F 15/00 | (2006.01) |
| G06F 7/38 | (2006.01) |
| G06F 9/00 | (2006.01) |
| G06F 9/44 | (2006.01) |
| G06F 11/34 | (2006.01) |
| G06F 9/46 | (2006.01) |

(52) U.S. Cl.
CPC .............. *G06F 11/348* (2013.01); *G06F 9/461* (2013.01); *G06F 2201/88* (2013.01)

(58) Field of Classification Search
None
See application file for complete search history.

(56) References Cited

U.S. PATENT DOCUMENTS

| | | | |
|---|---|---|---|
| 5,463,761 | A | 10/1995 | Culley |
| 6,112,318 | A | 8/2000 | Jouppi et al. |
| 6,556,952 | B1 | 4/2003 | Magro |
| 6,772,097 | B1 | 8/2004 | Kromenaker et al. |
| 6,931,354 | B2 | 8/2005 | Jones et al. |
| 7,272,754 | B2 | 9/2007 | Love et al. |
| 2005/0081101 | A1* | 4/2005 | Love et al. ............... 714/29 |
| 2006/0167658 | A1* | 7/2006 | Mericas ............... 702/182 |
| 2008/0177756 | A1 | 7/2008 | Kosche et al. |
| 2009/0024817 | A1* | 1/2009 | Oved .................. 711/170 |
| 2009/0089562 | A1* | 4/2009 | Schuchman et al. ........ 712/228 |

OTHER PUBLICATIONS

Browne et al. (A Portable Programming Interface for Performance Evaluation on Modern Processors, Aug. 2000, pp. 189-204).*
U.S. Official Action mailed May 3, 2012 in related U.S. Appl. No. 12/684,496.
U.S. Official Action mailed Mar. 20, 2012 in related U.S. Appl. No. 12/684,429.
U.S. Notice of Allowance mailed May 22, 2012 in related U.S. Appl. No. 12/684,172.

(Continued)

*Primary Examiner* — George Giroux
(74) *Attorney, Agent, or Firm* — Scully, Scott, Murphy and Presser, P.C.; Daniel P. Morris, Esq.

(57) ABSTRACT

A device for supporting hardware enabled performance counters with support for context switching include a plurality of performance counters operable to collect information associated with one or more computer system related activities, a first register operable to store a memory address, a second register operable to store a mode indication, and a state machine operable to read the second register and cause the plurality of performance counters to copy the information to memory area indicated by the memory address based on the mode indication.

20 Claims, 4 Drawing Sheets

(56) References Cited

OTHER PUBLICATIONS

U.S. Notice of Allowance mailed May 24, 2012 in related U.S. Appl. No. 12/684,367.
Moore, Research Disclosure Database No. 481010, High Performance Dynamically Updateable Software Architecture, May 2004.
Dalton, Chris et al., Afterburner: A Network-independent card provides architectural support for high-performance protocols, IEEE Jul. 1993.
Cameron, K.W., Instruction level characterization of scientific computing applications using hardware performance counters, IEEE Workload Characterization: Methodology and Case Studies, pp. 125-131, 1999.
U.S Office Action mailed in related U.S. Appl. No. 13/446,467 on Dec. 7, 2012.
U.S Office Action mailed in related U.S. Appl. No. 13/566,528 on Dec. 11, 2012.
Notice of Allowance dated Aug. 21, 2013 from related U.S. Appl. No. 13/446,467.

* cited by examiner

HARDWARE ENABLED PERFORMANCE COUNTERS WITH SUPPORT FOR OPERATING SYSTEM CONTEXT SWITCHING

STATEMENT REGARDING FEDERALLY SPONSORED RESEARCH OR DEVELOPMENT

This invention was made with Government support under Contract No.: B554331 awarded by Department of Energy. The Government has certain rights in this invention.

CROSS-REFERENCE TO RELATED APPLICATIONS

The present invention is related to the following commonly-owned, co-pending United States Patent Applications filed on even date herewith, the entire contents and disclosure of each of which is expressly incorporated by reference herein as if fully set forth herein. U.S. patent application Ser. No. 12/684,367, filed Jan. 8, 2010, for "USING DMA FOR COPYING PERFORMANCE COUNTER DATA TO MEMORY"; U.S. patent application Ser. No. 12/684,172, filed Jan. 8, 2010 for "HARDWARE SUPPORT FOR COLLECTING PERFORMANCE COUNTERS DIRECTLY TO MEMORY"; U.S. patent application Ser. No. 12/684,496, filed Jan. 8, 2010, for "HARDWARE SUPPORT FOR SOFTWARE CONTROLLED FAST RECONFIGURATION OF PERFORMANCE COUNTERS"; U.S. patent application Ser. No. 12/684,429, filed Jan. 8, 2010, for "HARDWARE SUPPORT FOR SOFTWARE CONTROLLED FAST MULTIPLEXING OF PERFORMANCE COUNTERS"; U.S. patent application Ser. No. 12/697,799, filed on Feb. 1, 2010, for "CONDITIONAL LOAD AND STORE IN A SHARED CACHE"; U.S. patent application Ser. No. 12/684,738, filed Jan. 8, 2010, for "DISTRIBUTED PERFORMANCE COUNTERS"; U.S. patent application Ser. No. 61/261,269, filed Nov. 13 2009, for "LOCAL ROLLBACK FOR FAULT-TOLERANCE IN PARALLEL COMPUTING SYSTEMS"; U.S. patent application Ser. No. 12/684,860, filed Jan. 8, 2010, for "PAUSE PROCESSOR HARDWARE THREAD UNTIL PIN"; U.S. patent application Ser. No. 12/684,174, filed Jan. 8, 2010, for "PRECAST THERMAL INTERFACE ADHESIVE FOR EASY AND REPEATED, SEPARATION AND REMATING"; U.S. patent application Ser. No. 12/684,184, filed Jan. 8, 2010, for "ZONE ROUTING IN A TORUS NETWORK"; U.S. patent application Ser. No. 12/684,852, filed Jan. 8, 2010, for "PROCESSOR WAKEUP RESUME UNIT"; U.S. patent application Ser. No. 12/684,642, filed Jan. 8, 2010, for "TLB EXCLUSION RANGE"; U.S. patent application Ser. No. 12/684,804, filed Jan. 8, 2010, for "DISTRIBUTED TRACE USING CENTRAL PERFORMANCE COUNTER MEMORY"; U.S. patent application Ser. No. 13/008,602, filed Jan. 18, 2011, for "CACHE DIRECTORY LOOKUP READER SET ENCODING FOR PARTIAL CACHE LINE SPECULATION SUPPORT"; U.S. patent application Ser. No. 61/293,237, filed Jan. 8, 2010, for "ORDERING OF GUARDED AND UNGUARDED STORES FOR NO-SYNC I/O"; U.S. patent application Ser. No. 12/693,972, filed Jan. 26, 2010, for "DISTRIBUTED PARALLEL MESSAGING FOR MULTIPROCESSOR SYSTEMS"; U.S. patent application Ser. No. 12/688,747, filed Jan. 15, 2010, for "SUPPORT FOR NON-LOCKING PARALLEL RECEPTION OF PACKETS BELONGING TO A SINGLE MEMORY RECEPTION FIFO"; U.S. patent application Ser. No. 12/688,773, filed Jan. 15, 2010, for "OPCODE COUNTING FOR PERFORMANCE MEASUREMENT"; U.S. patent application Ser. No. 12/684,776, filed Jan. 8, 2010, for "MULTI-INPUT AND BINARY REPRODUCIBLE, HIGH BANDWIDTH FLOATING POINT ADDER IN A COLLECTIVE NETWORK"; U.S. patent application Ser. No. 13/004,007, filed Jan. 10, 2011, for "MULTI-PETASCALE HIGHLY EFFICIENT PARALLEL SUPERCOMPUTER"; U.S. patent application Ser. No. 12/984,252, filed Jan. 4, 2011, for "CACHE WITHIN A CACHE"; U.S. patent application Ser. No. 13/008,502, filed Jan. 18, 2011, for "MULTIPROCESSOR SYSTEM WITH MULTIPLE CONCURRENT MODES OF EXECUTION"; U.S. patent application Ser. No. 13/008,583, filed Jan. 18, 2011, for "READER SET ENCODING FOR DIRECTORY OF SHARED CACHE MEMORY IN MULTIPROCESSOR SYSTEM"; U.S. patent application Ser. No. 12/984,308 filed on Jan. 4, 2011, for "EVICT ON WRITE, A MANAGEMENT STRATEGY FOR A PREFETCH UNIT AND/OR FIRST LEVEL CACHE IN A MULTIPROCESSOR SYSTEM WITH SPECULATIVE EXECUTION"; U.S. patent application Ser. No. 12/984,329 filed Jan. 4, 2011, for "PHYSICAL ALIASING FOR THREAD LEVEL SPECULATION WITH A SPECULATION BLIND CACHE"; 61/293,552, filed Jan. 8, 2010, for "LIST BASED PREFETCH"; U.S. patent application Ser. No. 12/684,693, filed Jan. 8, 2010, for "PROGRAMMABLE STREAM PREFETCH WITH RESOURCE OPTIMIZATION"; U.S. patent application Ser. No. 13/004,005, filed Jan. 10, 2011, for "VOLATILE MEMORY FOR CHECKPOINT STORAGE"; U.S. patent application Ser. No. 61/293,476, filed Jan. 8, 2010, for "NETWORK SUPPORT FOR SYSTEM INITIATED CHECKPOINTS"; U.S. patent application Ser. No. 12/696,746, filed on Jan. 29, 2010, for "TWO DIFFERENT PREFETCH COMPLEMENTARY ENGINES OPERATING SIMULTANEOUSLY"; U.S. patent application Ser. No. 12/697,015, filed on Jan. 29, 2010, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 61/293,559, filed Jan. 8, 2010, for "RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 12/727,984, filed Mar. 19, 2010, for "EFFICIENCY OF STATIC CORE TURN-OFF IN A SYSTEM-ON-A-CHIP WITH VARIATION"; U.S. patent application Ser. No. 12/697,043, Jan. 29, 2010, for "IMPLEMENTING ASYNCHRONOUS COLLECTIVE OPERATIONS IN A MULTI-NODE PROCESSING SYSTEM"; U.S. patent application Ser. No. 13/008,546, filed Jan. 18, 2011, for "ATOMICITY: A MULTI-PRONGED APPROACH"; U.S. patent application Ser. No. 12/697,175, filed Jan. 29, 2010 for "I/O ROUTING IN A MULTIDIMENSIONAL TORUS NETWORK"; U.S. patent application Ser. No. 12/684,287, filed Jan. 8, 2010 for ARBITRATION IN CROSSBAR FOR LOW LATENCY; U.S. patent application Ser. No. 12/684,630, filed Jan. 8, 2010, for "EAGER PROTOCOL ON A CACHE PIPELINE DATAFLOW"; U.S. patent application Ser. No. 12/723,277, filed Mar. 12, 2010 for EMBEDDED GLOBAL BARRIER AND COLLECTIVE IN A TORUS NETWORK; U.S. patent application Ser. No. 12/696,764, filed Jan. 29, 2010 for "GLOBAL SYNCHRONIZATION OF PARALLEL PROCESSORS USING CLOCK PULSE WIDTH MODULATION"; U.S. patent application Ser. No. 12/796,411, filed Jun. 8, 2010 for "GENERATION-BASED MEMORY SYNCHRONIZATION IN A MULTIPROCESSOR SYSTEM WITH WEAKLY CONSISTENT MEMORY ACCESSES"; U.S. patent application Ser. No. 12/796,389, filed Jun. 8, 2010 for BALANCING WORKLOAD IN A MULTIPROCESSOR SYSTEM RESPONSIVE TO PROGRAMMABLE ADJUSTMENTS IN A SYNCRONIZATION INSTRUCTION; U.S. patent application Ser. No. 12/696,817, filed Jan. 29, 2010 for HEAP/STACK GUARD PAGES USING A WAKEUP UNIT; U.S. patent application Ser. No. 61/293,603, filed Jan. 8, 2010 for MECHANISM OF SUPPORTING SUB-COMMUNICATOR COLLECTIVES WITH O(64) COUNTERS AS OPPOSED TO ONE COUNTER FOR EACH SUB-COMMUNICATOR; and U.S. patent application Ser. No. 12/774,475, filed May 5, 2010 for "REPRODUCIBILITY IN A MULTIPROCESSOR SYSTEM".

FIELD OF THE INVENTION

The present disclosure relates generally to performance counters and operating systems, and more particularly to hardware support for allowing the operating system to perform efficient context switching for systems containing performance counters.

BACKGROUND

Understanding the performance of programs running on today chips is complicated. Programs themselves are becoming increasingly complex and intertwined with a growing number of layers in the software stack. Hardware chips are also becoming more complex. The current generation of chips is multicore and the next generation will be likely to have even more cores and will include networking, switches, and other components integrated on to the chip.

Performance counters can help programmers address the challenges created by the above complexity by providing insight into what is happening throughout the chip, in the functional units, in the caches, and in the other components on the chip. Performance counter data also helps programmers understand application behavior. Chips have incorporated performance counters for several generations, and software ecosystems have been designed to help analyze the data provided by such counters.

Hardware performance counters provide insight into the behavior of the various aspects of a chip. Generally, hardware performance counters are extra logic added to the central processing unit (CPU) to track low-level operations or events within the processor. For example, there are counter events that are associated with the cache hierarchy that indicate how many misses have occurred at L1, L2, and the like. Other counter events indicate the number of instructions completed, number of floating point instructions executed, translation lookaside buffer (TLB) misses, and others. Depending on the chip, there are different numbers of counter events available that provide information about the chip. However, most chip architectures only allow a small subset of these potential counter events to be counted simultaneously. This number is limited by the number of actual number of performance counters available.

Operating Systems, e.g., Windows™ XP™, Linux™, are entities that manage the hardware resources, e.g., disks, memory, hardware performance counters, etc., of a computer and make them available to an application, e.g., Firefox™, Microsoft™ Word™. One particular abstract an operating system provides is called a process. A process is an entity that runs an application. For example, to run Firefox™, Linux™ creates a process, loads the Firefox™ code into memory and then runs Firefox™. Among many responsibilities involved in managing processes, an operating system is responsible for managing context switching the central processing unit (CPU) or small number of CPUs between the different processes. To perform a context switch the operating system saves the state of the running process in a place that can be later retrieved when the process needs to be run again. The operating system then locates the state of the process it wishes to execute and loads that process's state from where it had stored it. On a running Linux™ of Windows™ computer there may be over fifty processes in existence that need to share the CPU. The performance of the context switch path is an affecting factor for achieving good performance for some classes of application.

Associated with each process is a set of machine state, this state includes, among information, the values of the current registers, including general registers, floating point registers, machine status registers, and hardware performance counter state and data. For some modes of performance monitoring tools, the hardware performance counter information must be kept on a per-process base. The operating system may be thus responsible for providing a mechanism that allows this hardware performance counter state to be saved before a context switch and restored after the context switch. The operating system should provide a mechanism that performs this operation for each process on every context switch.

For saving the hardware performance counter state before a context switch and restoring the state after the context switch, the conventional operating system would have to read the control registers associated with the hardware performance counter control and each of the counters individually. While the number of hardware performance control registers and counters varies among different chip architectures, a mechanism that allows for more efficient saving and restoring of the hardware performance control registers and counter data would be beneficial.

BRIEF SUMMARY

A device and method for supporting hardware enabled performance counters with support for context switching are provided. The device, in one aspect, may include a plurality of performance counters operable to collect information associated with one or more computer system related activities. The device may also include a first register operable to store a memory address and a second register operable to store a mode indication. A state machine may be operable to read the second register and cause the plurality of performance counters to copy the information to memory area indicated by the memory address based on the mode indication.

A method for hardware enabled performance counters with support for context switching, in one aspect, may include writing a memory address into memory and setting a context switch register to indicate that information in a plurality of performance counters should be copied to memory area specified by the memory address. The method may also include hardware copying information of the plurality of performance counters to the memory area based on the setting of the context switch register. The method may further include resetting the context switch register to indicate completion of the copying by the hardware.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

We disclose the ability for software-initiated automatic saving and restoring of the data associated with the performance monitoring unit including the entire set of control registers and associated counter values. Automatic refers to the fact that the hardware goes through each of the control registers and data values of the hardware performance counter information and stores them all into memory rather than requiring the operating system or other such software (for example, one skilled in the art would understand how to apply the mechanisms described herein to a hypervisor environment) to read out the values individually and store the values itself.

While there are many operations that need to occur as part of a context switch, this disclosure focuses the description on those that pertain to the hardware performance counter infrastructure. In preparation for performing a context switch, the operating system, which knows of the characteristics and capabilities of the computer, will have set aside memory associated with each process commensurate with the number of hardware performance control registers and data values.

Figure 1:
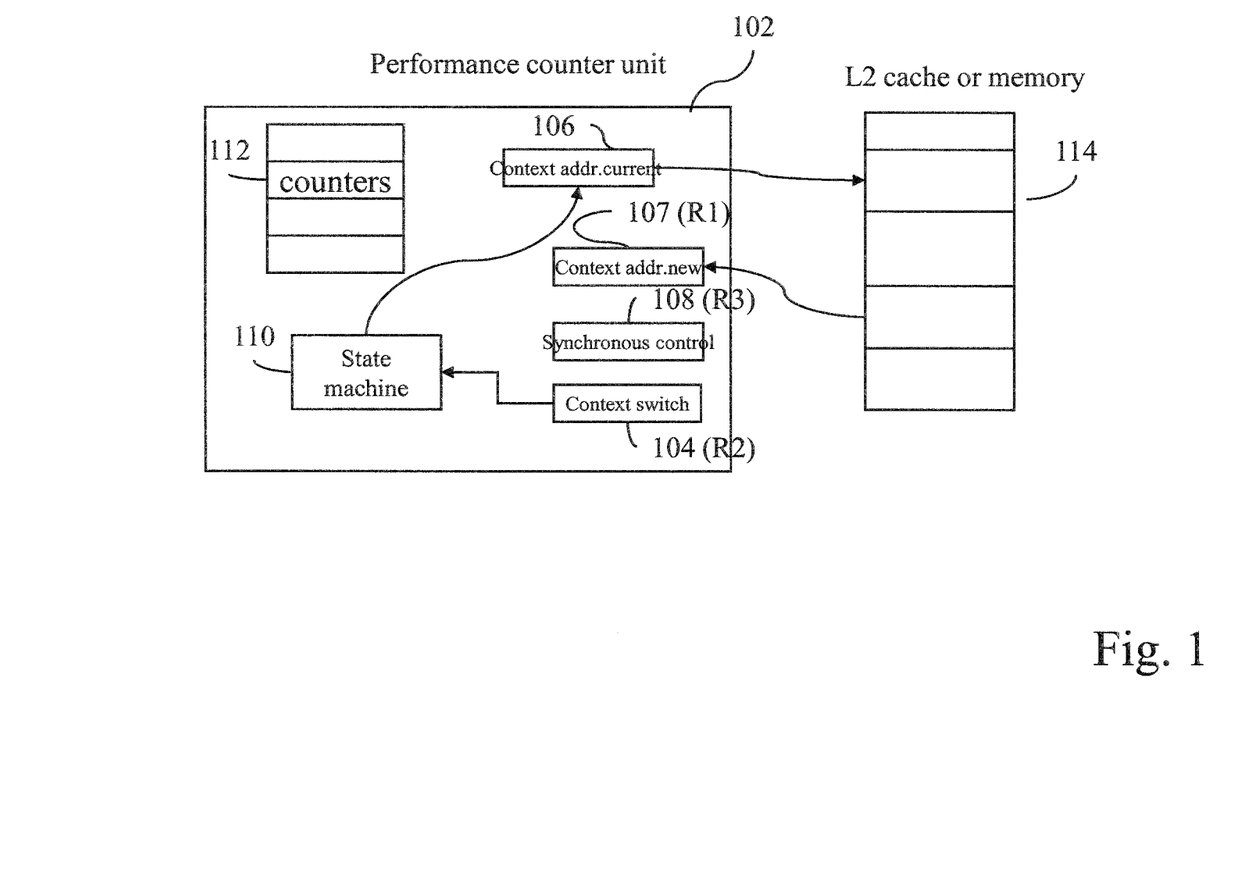
FIG. 1 illustrates an architectural diagram showing hardware enabled performance counters with support for operating system context switching in one embodiment of the present disclosure.

One embodiment of the hardware implementation to perform the automatic saving and restoring of data may utilize two control registers associated with the infrastructure, i.e., the hardware performance counter unit. One register, R1 (for convenience of naming), 107, is designated to hold the memory address that data is to be copied to or from. Another register, for example, a second register R2, 104, indicates whether and how the hardware should perform the automatic copying process. The value of second register is normally a zero. When the operating system wishes to initiate a copy of the hardware performance information to memory it writes a value in the register to indicate this mode. When the operating system wishes to initiate a copy of the hardware performance values from memory it writes another value in the register that indicates this mode. For example, when the operating system wishes to initiate a copy of the hardware performance information to memory it may write a "1" to the register, and when the operating system wishes to initiate a copy of the hardware performance values from memory it may write a "2" to the register. Any other values to indications may be utilized. This may be an asynchronous operation, i.e., the hardware and the operating system may operate or function asynchronously. An asynchronous operation allows the operating system to continue performing other tasks associated with the context switch while the hardware automatically stores the data associated with the performance monitoring unit and sets an indication when finished that the operating system can check to ensure the process was complete. Alternatively, in another embodiment, the operation may be performed synchronously by setting a third register. For example, R3, 108 can be set to "1" indicating that the hardware should not return control to the operating system after the write to R2 until the copying operation has completed.

FIG. 1 illustrates an architectural diagram showing hardware enabled performance counters with support for operating system context switching in one embodiment of the present disclosure. A performance counter unit 102 may be built into a microprocessor, or in a multiprocessor system, and includes a plurality of hardware performance counters 112, which are registers used to store the counts of hardware-related activities within a computer. Examples of activities of which the counters 118 may store counts may include, but are not limited to, cache misses, translation lookaside buffer (TLB) misses, the number of instructions completed, number of floating point instructions executed, processor cycles, input/output (I/O) requests, and other hardware-related activities and events.

A memory device 114, which may be an L2 cache or other memory, stores various data related to the running of the computer system and its applications. A register 106 stores an address location in memory 114 for storing the hardware performance counter information associated with the switched out process. For example, when the operating system determines it needs to switch out a given process A, it looks up in its data structures the previously allocated memory addresses (e.g., in 114) for process A's hardware performance counter information and writes the beginning value of that address range into a register 106. A register 107 stores an address location in memory 114 for loading the hardware performance counter information associated with the switched in process. For example, when the operating system determines it needs to switch in a given process B, it looks up in its data structures the previously allocated memory addresses (e.g., in 114) for process B's hardware performance counter information and writes the beginning value of that address range into a register 107.

Context switch register 104 stores a value that indicates the mode of copying, for example, whether the hardware should start copying, and if so, whether the copying should be from the performance counters 112 to memory 114, or from the memory 114 to the performance counters 112, for example, depending on whether the process is being context switched in or out. Table 1 for examples shows possible values that may be stored by or written into the context switch 102 as an indication for copying. Any other values may be used.

TABLE 1

| Value | Meaning of the value |
|---|---|
| 0 | No copying needed |
| 1 | Copy the current values from the performance counters to the memory location indicated in the context address current register, and then copy values from the memory location indicated in the context address new to the performance counters |
| 2 | Copy from the performance counters to the memory location indicated in the context address register |
| 3 | Copy from the memory location indicated in context address register to the performance counters |

The operating system for example writes those values into the register 104, according to which the hardware performs its copying.

A control state machine 110 starts the context switch operation of the performance counter information when the register 104 holds values that indicate that the hardware should start copying. If the value in the register 104 is 1 or 2, the circuitry of the performance counter unit 102 stores the current context (i.e., the information in the performance counters 112) of the counters 112 to the memory area 114 specified in the context address register 106. This actual data copying can be performed by a simple direct memory access engine (DMA), not shown in the picture, which generates all bus signals necessary to store data to the memory. Alternatively, this functionality can be embedded in the state machine 110. All performance counters and their configurations are saved to the memory starting at the address specified in the register 106. The actual arrangement of counter values and configuration values in the memory addresses can be different for different implementations, and does not change the scope of this invention.

If the value in the register 104 is 3, or is 1 and the copy-out step described above is completed, the copy-in step starts. The new context (i.e., hardware performance counter information associated with the process being switched in) is loaded from the memory area 114 indicated in the context address 107. In addition, the values of performance counters are copied from the memory back to the performance counters 112. The exact arrangement of counter values and configurations values does not change the scope of this invention.

When the copying is finished, the state machine 110 sets the context switch register to a value (e.g., "0") that indicates that the copying is completed. In another embodiment, the performance counters may generate an interrupt to signal the completion of copying. The interrupt may be used to notify the operating system that the copying has completed. In one embodiment, the hardware clears the context switch register 104. In another embodiment, the operating system resets the context switch register value 104 (e.g., "0") to indicate no copying.

The state machine 110 copies the memory address stored in the context address register 107 to the context address register 106. Thus, the new context address is free to be used in the future for the next context switch, and the current context will be copied back to its previous memory location.

In another embodiment of the implementation, the second context address register 107 may not be needed. That is, the operating system may use one context address register 106 for indicating the memory address to copy to or to copy from, for context switching out or context switching in, respectively. Thus, for example, register 106 may be also used for indicating a memory address from where to context switch in the hardware performance counter information associated with a process being context switched in, when the operating system is context switching back in a process that was context switched out previously.

Additional number of registers or the like, or different configurations for hardware performance counter unit may be used to accomplish the automatic saving of storing and restoring of contexts by the hardware, for example, while the operating system may be performing other operations or tasks, and/or, so that the operating system or the software or the like need not individually read the counters and associated controls.

Figure 2:
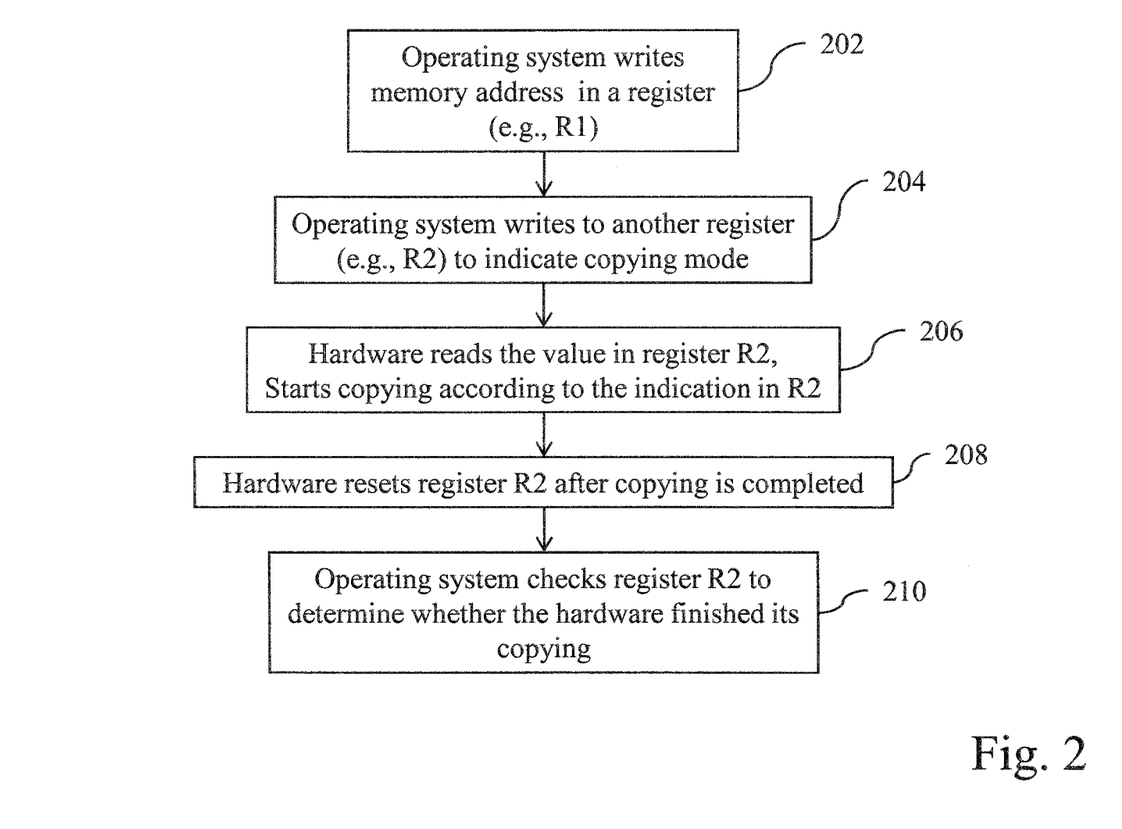
FIG. 2 is a flow diagram illustrating a method for hardware enabled performance counters with support for operating system context switching in one embodiment of the present disclosure.

FIG. 2 is a flow diagram illustrating a method for hardware enabled performance counters with support for operating system context switching in one embodiment of the present disclosure. While the method shown in FIG. 2 illustrates a specific steps for invoke the automatic copying mechanisms using several registers, it should be understood that other implementation of the method and any number of registers or the like may be used for the operating system or the like to invoke an automatic copying of the counters to memory and memory to counters by the hardware, for instance, so that the operating system or the like does not have to individually read the counters and associated controls.

Referring to FIG. 2, at 202 when the operating system determines it needs to switch out a given process A, it looks up in its data structures the previously allocated memory addresses for process A's hardware performance counter information and writes the beginning value of that range into a register, e.g., register R1. At 204, the operating system or the like then writes a value in another register, e.g., register R2 to indicate that copying from the performance counters to the memory should begin. For instance, the operating system or the like writes "1" to R2. At 206, the hardware identifies that the value in register R2 or the like indicates data copy-out command, and based on the value performs copying. For example, writing values 1 or 2 in the register R2 generates a signal "start copying data" which causes the state machine to enter the state "copy data". In this state, for example, data are stored to the memory starting at the specified memory location, and respecting the implemented bus protocol. This step may include driving bus control signals to specify store operation, driving address lines with destination address and driving data lines with data values to be stored. The exact memory writing protocol of the particular implementation may be followed, i.e., how many cycles these bus signals need to be driven, and if there is an acknowledgement signal from the memory that writing succeeded. The exact bus protocol and organization does not change the scope of this invention. The data store operation is performed for all values which need to be copied.

The operating system or the like may proceed in performing other operations while the hardware copies that data from the hardware performance control and data registers. At 208, after the hardware finishes copying, the hardware resets the value at register R1, for example, to "0" to indicate that the copying is done. At 208, prior to completing the context switch, the operating system or the like checks the value of register R2 to make sure it is "0" or another value, which indicates that the hardware has finished the copy.

For context switching back in process B, the operating system or the like may perform the similar procedure. For example, the operating system writes the beginning of the range of addresses used for storing hardware performance counter information associated with process B into register R1 (or another such designated memory location), writes a value (e.g., "3") into register R2 to indicate to the hardware to start copying from the memory location specified in register R1 to the hardware performance counters. The operating system or the like may proceed with other context restoring operation, Prior to returning control to the process, the operating system verifies that the hardware finished its copying function, for example, by checking the value in R2 (in this example, checking for "0" value). In this way, the copying of the hardware performance counter information with the other operations needed when performing a context switch can be performed in parallel, or substantially in parallel.

In another embodiment, rather than having the operating system check a register to determine whether the hardware completed its copying, another register, R3, may be used to indicate to the hardware whether and when the control to the operating system should be returned. For instance, if this register is set to a predetermined value, e.g., "1", the hardware will not return control to the operating system until the copy is complete. For example, this register, or a bit in another control register, is labeled "interrupt enabled", and it specifies that an interrupt signal should be raised when data copy is complete. Operating system performs operations which are part of context switching in parallel. Once this interrupt is received, operating system is informed that all data copying of the performance counters is completed.

Figure 3:
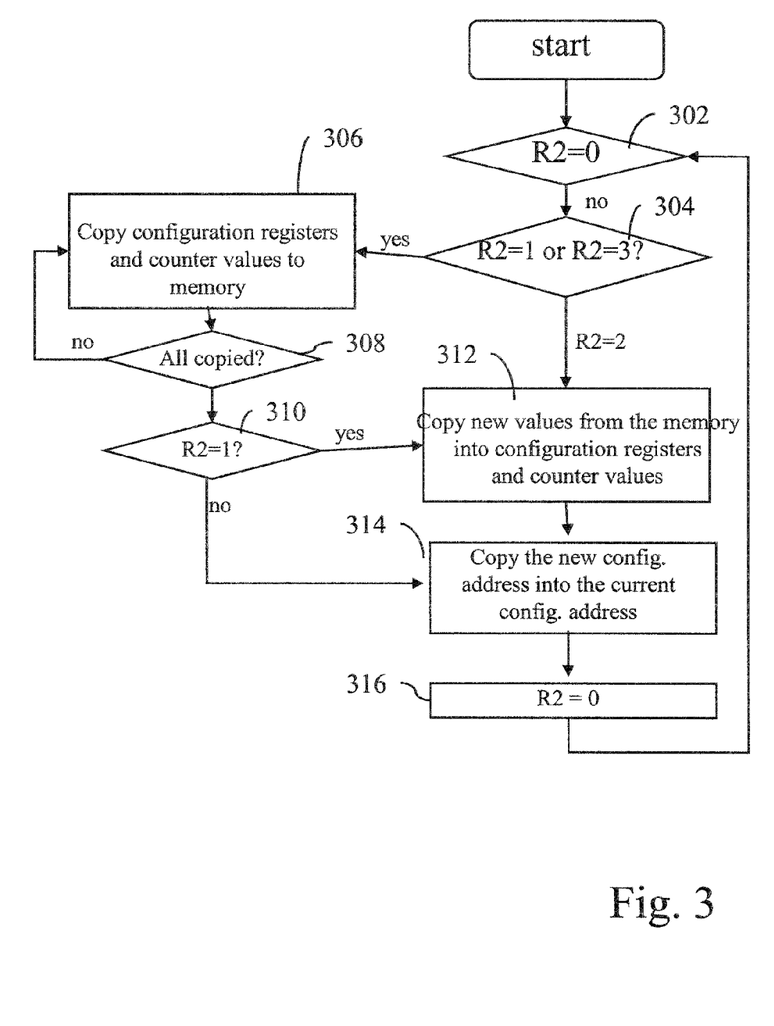
FIG. 3 is a flow diagram illustrating hardware enabled performance counters with support for operating system context switching using a register setting in one embodiment of the present disclosure.

FIG. 3 is a flow diagram illustrating hardware enabled performance counters with support for operating system context switching using a register setting in one embodiment of the present disclosure. At 302, if the register value is not zero, the method may proceed to 304. At 304, if the register value is one or three, configuration registers and counter values are copied to memory at 306. At 308 if all configuration registers and counter values have been copied, the method may proceed to 310. At 310, if the register value is one, the method proceeds to 312, otherwise the method proceeds to 314. Also at 304 if the register value was not one and not three, then the method proceeds to 312. At 312, values from the memory are copied into configuration registers and counter values. At 314, new configuration address is copied into the current configuration address. At 316, the register value is set to zero.

The above described examples used the register values as being set to "0", "1", and "2" in explaining the different modes indicated in the register value. It should be understood, however, that any other values may be used to indicate the different modes of copying.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
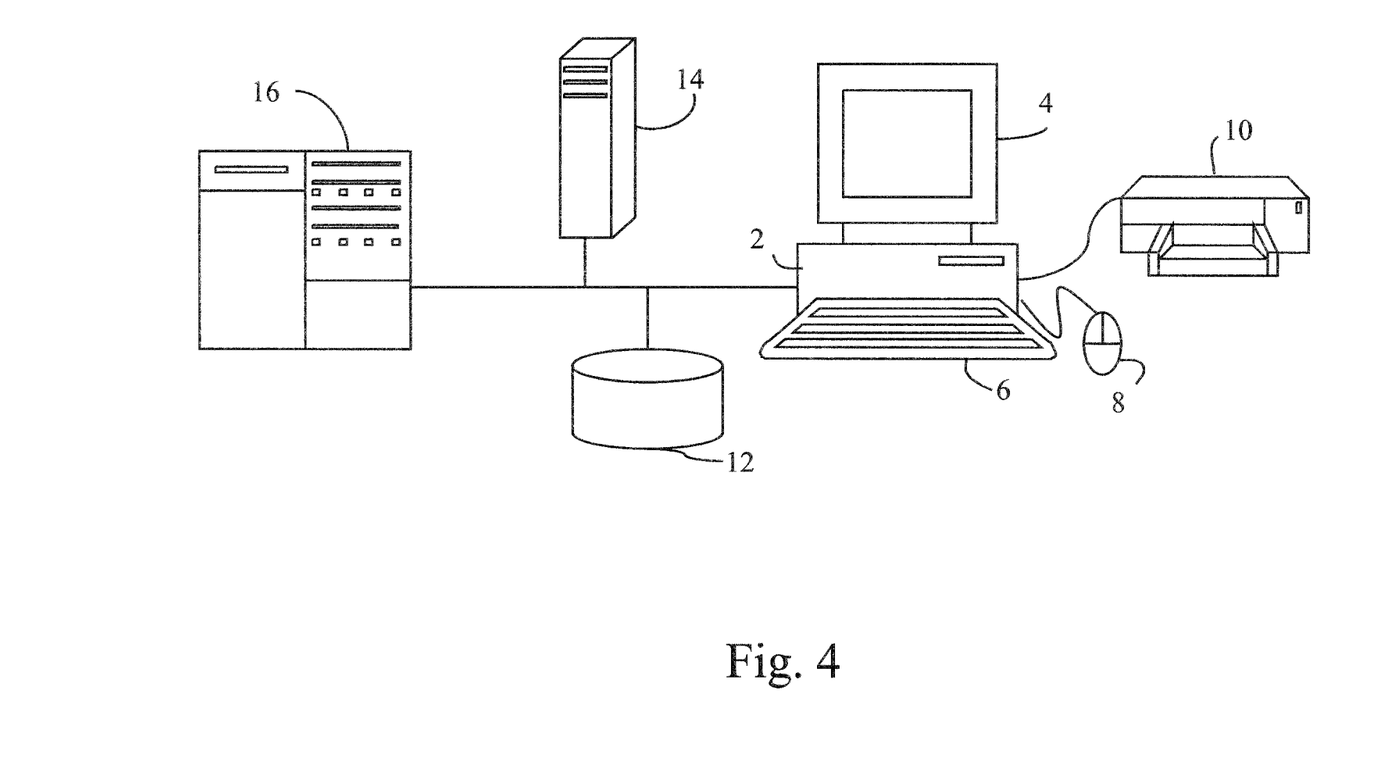
FIG. 4 illustrates an example of a computer system, in which the systems and methodologies of the present disclosure may be carried out or executed.

Referring now to FIG. 4, the systems and methodologies of the present disclosure may be carried out or executed in a computer system that includes a processing unit 2, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 2 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 6 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 10, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 14, 16), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A device for supporting hardware enabled performance counters with support for context switching, comprising:
   a plurality of performance counters operable to collect information associated with one or more computer system related activities;
   a first register associated with a performance counter unit that implements the performance counters, the first register operable to store a memory address;
   a second register operable to store a mode indication, the mode indication comprising at least whether to switch out contents of the performance counters, whether to switch in contents of the performance counter, or both, the operating system writing the mode indication to initiate a copy; and a hardware state machine operable to read the second register and cause the plurality of performance counters to copy the information to memory area indicated by the memory address written into the first register by an operating system, based on the mode indication, wherein the hardware state machine automatically saves and restores data associated with all of the performance counters implemented by the performance counter unit, while the operating system performs other tasks associated with the context switching.

2. The device of claim 1, wherein the state machine is further operable to cause data from the memory area to be copied to the plurality of performance counters based on the mode indication.

3. The device of claim 1, further including a third register operable to store a value indicating whether the state machine should return control to an operating system immediately or after copying has completed.

4. The device of claim 1, wherein the second register is written into by an operating system to invoke hardware to automatically begin copying the information while the operating system is performing another context switch related operation.

5. The device of claim 1, further including a fourth register operable to store a memory address from where to copy data to the plurality of performance counters.

6. The device of claim 5, wherein the memory address in the fourth register is written to the first register.

7. A method for hardware enabled performance counters with support for context switching, comprising:

writing a memory address into memory by an operating system;

setting a context switch register by the operating system to indicate that information in a plurality of performance counters implemented in a performance counter unit should be copied to memory area specified by the memory address;

copying, by hardware, information of the plurality of performance counters to the memory area based on the setting of the context switch register; and resetting the context switch register to indicate completion of the copying by the hardware, wherein the hardware automatically saves and restores data associated with all of the performance counters implemented by the performance counter unit, while the operating system performs other tasks associated with the context switching.

8. The method of claim 7, where in the writing and setting steps are performed by an operating system.

9. The method of claim 7, wherein the copying, by hardware, is performed asynchronously of operating system operations.

10. The method of claim 7, wherein the resetting step is performed by the hardware.

11. The method of claim 7, wherein the context switch register is set to indicate copying from the plurality of performance counters to the memory area.

12. The method of claim 7, wherein the context switch register is set to indicate copying from a memory area to the plurality of performance counters.

13. The method of claim 7, wherein an interrupt is generated to signal completion of copying.

14. The method of claim 7, wherein the hardware withholds control from an operating system until the hardware completes copying.

15. A non-transitory computer readable storage medium storing a program of instructions executable by a machine to perform a method for hardware enabled performance counters with support for context switching, the method comprising:

writing a memory address into memory associated with a plurality of performance counters implemented in a performance counter unit, by an operating system;

setting a context switch register by the operating system to indicate that information in the plurality of performance counters should be copied to memory area specified by the memory address;

copying, by hardware, information of the plurality of performance counters to the memory area based on the setting of the context switch register; and resetting the context switch register to indicate completion of the copying by the hardware, wherein the hardware automatically saves and restores data associated with all of the performance counters implemented by the performance counter unit, while the operating system performs other tasks associated with the context switching.

16. The computer readable storage medium of claim 15, where in the writing and setting steps are performed by an operating system.

17. The computer readable storage medium of claim 15, wherein the copying, by hardware, is performed asynchronously of operating system operations.

18. The computer readable storage medium of claim 15, wherein the resetting step is performed by the hardware.

19. The computer readable storage medium of claim 15, wherein the context switch register is set to indicate copying from the plurality of performance counters to the memory area.

20. The computer readable storage medium of claim 15, wherein the context switch register is set to indicate copying from a memory area to the plurality of performance counters.

* * * * *